(No Model.)

L. T. SHEFFIELD.
ARTIFICIAL DENTURE.

No. 318,580. Patented May 26, 1885.

Witnesses:
H. E. Hansmann.
Wm. F. Jayers.

Lucius T. Sheffield,
Inventor.
By Foster & Freeman
Attorneys

UNITED STATES PATENT OFFICE.

LUCIUS T. SHEFFIELD, OF NEW YORK, N. Y.

ARTIFICIAL DENTURE.

SPECIFICATION forming part of Letters Patent No. 318,580, dated May 26, 1885.

Application filed August 12, 1884. (No model.)

*To all whom it may concern:*

Be it known that I, LUCIUS T. SHEFFIELD, a citizen of the United States, residing in the city, county, and State of New York, have invented certain new and useful Improvements in the Preparation of Artificial Dentures, of which the following is a specification.

My invention has for its object to avoid the difficulties incident to the ordinary modes of obtaining articulation in the making of artificial teeth; and it consists in forming a mold of some hard-setting material of both jaws simultaneously, one side of which being an impression of the jaw upon which is to be placed the bridge or structure, and the other side being a mold of the opposing or articulating teeth, and in then making and fitting together detachably casts from both sides of the mouth, to secure the proper articulation of the artificial teeth upon casts without the necessity of fitting them in the mouth.

Figure 1:
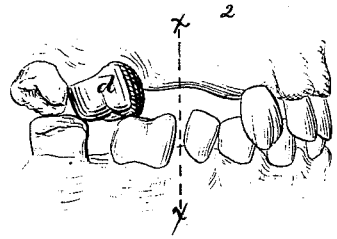
Figure 5:
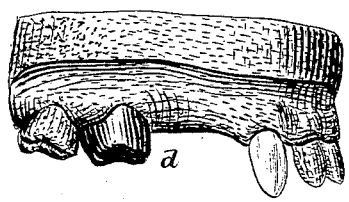
Figure 2:
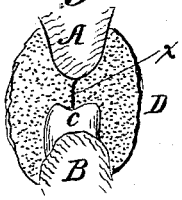
Figure 6:
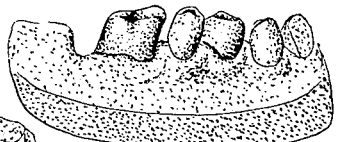
Figure 3:
Figure 4:
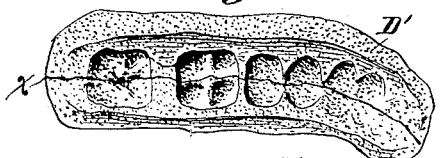
Figure 7:
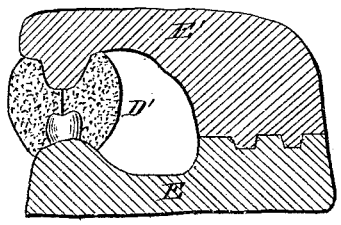

In the drawings, Figure 1 represents the upper and lower jaws and natural teeth in the position occupied when the mouth is closed. Fig. 2 is a section on the line $x$ $x$, illustrating the method of applying the impression material to make the mold. Figs. 3 and 4 represent opposite sides of the mold. Fig. 5 illustrates a cast taken from the upper side of the mold. Fig. 6 illustrates a cast taken from the lower side of the mold. Fig. 7 is a sectional view showing the mold and detachable casts in position.

It has not been possible by the ordinary methods employed to secure the articulation with any precision, because of the drawing of the wax in taking impression, the result being that after the artificial teeth have been secured in place the approximating teeth of the opposing jaws must, in most instances, be fitted to each other in the mouth, necessitating their frequent removal and considerable grinding and adjustment.

To avoid the objections incident to the ordinary methods I take the impressions of both jaws simultaneously, as heretofore, in one mass of a material which will set hard, it being inserted in the mouth in a plastic or soft condition, and hardens therein around the teeth of both jaws after the same have been brought together in their usual relation. The cast or impression is then removed and a mold is formed first from one side and then from the other of the impression in two parts, which are so fitted together detachably that after the removal of the impression they will occupy the same relative position as the corresponding portions of the two jaws. The artificial teeth may then be mounted on their supports in such manner as to exactly define their position in respect to the natural teeth.

The impression may be taken in plaster or other suitable material. I prefer, however, to use a mixture of plaster with sufficient sulphate of potash to insure a rapid hardening. This material while soft is placed upon the upper and lower teeth in sufficient quantity to fully cover the gums and teeth of both jaws, care being taken to place a sufficient amount on the lingual side of the teeth, and the patient is then instructed to bring the teeth together naturally to their closed position. The teeth are retained in this position until the plaster is hardened, when the mouth is opened and the material is removed.

The position of the impression material when the jaws are brought together is indicated in Fig. 2, in which A represents the upper jaw; B, the lower jaw; $c$, one of the teeth, and D the impression material.

In removing the material D it will generally separate longitudinally upon the line $x$, Figs. 2, 3, and 4; but the parts may be brought together and cemented or waxed in position, if desired; or they may be tied together, so as to constitute, practically, one piece during subsequent operations.

Figs. 3 and 4 represent opposite sides of a mold, D', made in the manner above indicated from one side of the jaws, in which the teeth occupy the position illustrated in Fig. 1, Fig. 3 showing the impression made by teeth in the upper jaw, and Fig. 4 the impression of the teeth of the lower jaw. A case, E, is now made from one side of the mold D', and after it has hardened a second cast, E', is made to coincide with part of the first and with the opposite side of the mold D', and the latter is then removed, when the two casts E E' will occupy in respect to each other precisely the relation of the two jaws of the mouth when the teeth are closed together, and the artificial denture may then be prepared with the artificial teeth in proper relation to those of the natural teeth by the means of said casts as guides, in a manner too well known to require further explanation.

It will of course be understood that after the first cast E is made, the parts of the cast and molds to which the new material for the cast E' is to be applied are to be varnished and soaped, so as to secure a ready separation, to permit the removal of the mold and the detachment of one cast from the other.

The crowns $d$, covering the natural teeth, Fig. 1, are first fitted and applied to the natural teeth before the application of the impression material, and will therefore remain embedded in the mold D' when the latter is removed from the mouth, and will remain in position upon the cast E', Fig. 5, when the mold is removed from between the cast, so that the said crowns will occupy upon the cast precisely the same position which they occupy upon the natural teeth in the mouth. The artificial teeth are then fitted to and mounted in proper position upon the supports, or secured to the crowns and fitted to the casts, and when the denture is complete it is removed from the cast and applied within the mouth.

Without limiting myself to the special materials or precise operations hereinbefore specified,

I claim—

1. The within-described improvement in the manufacture of artificial dentures, the same consisting in first forming a mold of both the upper and lower natural jaw and teeth and of material hardened around both jaws and teeth when the same are closed, and then forming casts of opposite sides of said mold and adapted to but separable from each other, and in then adjusting and fitting the dentures in relative position upon said casts, substantially as set forth.

2. In the manufacture of artificial dentures, first forming a mold by applying plastic material to both the natural jaws and allowing it to harden while the jaws are in their closed position; second, forming a cast from one side of said mold; third, forming a second cast from the opposite side of said mold, which fits a portion of the cast first formed; and, fourth, adjusting the artificial teeth in proper position upon said cast, and fitting and connecting them to the supports thereon, all substantially as set forth.

3. In the manufacture of artificial dentures, applying crowns to the supporting-teeth of the jaws, then forming a mold of both jaws by material hardened around the same while they are brought together, then removing the mold, with the crowns in position, and forming casts from opposite sides of said mold, and then securing the supports for the artificial teeth to the crowns and mounting the said teeth thereon, substantially as specified.

In testimony whereof I have signed my name to this specification in the presence of two subscribing witnesses.

LUCIUS T. SHEFFIELD.

Witnesses:
　GEO. H. EVANS,
　F. L. FREEMAN.